US009476431B2

(12) United States Patent
Heubner et al.

(10) Patent No.: US 9,476,431 B2
(45) Date of Patent: Oct. 25, 2016

(54) HYDRAULIC ACTUATING DEVICE FOR ACTUATION OF ONE OR MORE SETTING ELEMENTS IN, IN PARTICULAR, A MOTOR VEHICLE TRANSMISSION

(75) Inventors: Wilhelm Heubner, Itzgrund (DE); Sonja Lenke, Bamberg (DE)

(73) Assignee: FTE automotive GmbH, Ebern (DE)

( * ) Notice: Subject to any disclaimer, the term of this patent is extended or adjusted under 35 U.S.C. 154(b) by 1080 days.

(21) Appl. No.: 13/541,070

(22) Filed: Jul. 3, 2012

(65) Prior Publication Data

US 2013/0008156 A1    Jan. 10, 2013

(30) Foreign Application Priority Data

Jul. 6, 2011 (DE) .................. 10 2011 107 263

(51) Int. Cl.
*F16H 63/34* (2006.01)
*F15B 11/12* (2006.01)
(Continued)

(52) U.S. Cl.
CPC ......... *F15B 11/122* (2013.01); *F16H 63/3483* (2013.01); *F16H 63/48* (2013.01); *F15B 7/006* (2013.01); *F15B 2211/20515* (2013.01); *F15B 2211/20561* (2013.01); *F15B 2211/27* (2013.01); *F15B 2211/3058* (2013.01); *F15B 2211/6336* (2013.01); *F15B 2211/665* (2013.01); *F15B 2211/6651* (2013.01);
(Continued)

(58) Field of Classification Search
CPC ...... F15B 15/26; F15B 15/261; F15B 7/006; F15B 11/122; F16H 63/3483; F16H 63/48
See application file for complete search history.

(56) References Cited

U.S. PATENT DOCUMENTS

| 5,048,656 A | * | 9/1991 | Braun | ..................... B60T 17/16 |
| | | | | 192/114 R |
| 5,342,255 A | | 8/1994 | Slesinski et al. | |

(Continued)

FOREIGN PATENT DOCUMENTS

| CN | 101149110 A | 3/2008 |
| CN | 101344168 A | 1/2009 |

(Continued)

OTHER PUBLICATIONS

Chinese First Office Action, Application No. 201210234535.6, Applicant: FTE Automotive GmbH, Mailing Date: Dec. 26, 2014, Translation included, 15 pages.

*Primary Examiner* — Nathaniel Wiehe
*Assistant Examiner* — Abiy Teka
(74) *Attorney, Agent, or Firm* — Reising Ethington P.C.

(57) ABSTRACT

An actuating device for hydraulically actuating at least one setting element comprising a pump, which has an electric pump drive, with reversible pumping direction, at least one double-acting piston-cylinder arrangement, which is connected therewith and the piston of which is operatively connected with the setting element, and a hydraulic fluid reservoir from which the hydraulic fluid can be pumped to the piston-cylinder arrangement in order to hydraulically load the piston thereof for a setting element movement depending on pumping direction on one (effective surface 22) or other (effective surface 24) side. In this connection, the piston-cylinder arrangement is functionally associated with a detent device with a blocking element, which is spring-biased into a blocking position preventing setting element movement and is movable by an electrically activatable actuator from the blocking position into a release position permitting setting element movement.

17 Claims, 4 Drawing Sheets

(51) Int. Cl.
*F16H 63/48* (2006.01)
*F15B 7/00* (2006.01)

(52) U.S. Cl.
CPC ............... *F15B 2211/7053* (2013.01); *F15B 2211/7054* (2013.01); *F15B 2211/7128* (2013.01); *F15B 2211/72* (2013.01); *F15B 2211/785* (2013.01)

(56) References Cited

U.S. PATENT DOCUMENTS

| | | | |
|---|---|---|---|
| 5,850,898 A | 12/1998 | Bohme et al. | |
| 5,857,381 A | 1/1999 | Mentink | |
| 6,116,391 A * | 9/2000 | Kremmling | F16H 59/70 192/3.3 |
| 6,234,060 B1 * | 5/2001 | Jolly | F15B 15/26 91/361 |
| 6,497,215 B1 | 12/2002 | Gaessler et al. | |
| 6,626,056 B2 | 9/2003 | Albert et al. | |
| 8,157,076 B2 | 4/2012 | Foster | |
| 8,215,197 B2 | 7/2012 | Mohr et al. | |
| 8,667,859 B2 | 3/2014 | Engel et al. | |
| 2007/0216401 A1 * | 9/2007 | Baak | F15B 15/2861 324/207.24 |
| 2009/0007626 A1 | 1/2009 | Bochen et al. | |
| 2012/0312655 A1 | 12/2012 | Heubner | |
| 2013/0008156 A1 | 1/2013 | Heubner et al. | |

FOREIGN PATENT DOCUMENTS

| | | | |
|---|---|---|---|
| CN | 201202804 Y | 3/2009 | |
| DE | 43 09 901 A1 | 9/1994 | |
| DE | 199 00 852 A1 | 7/1999 | |
| DE | 19900852 A1 * | 7/1999 | ............ F16H 61/30 |
| EP | 1 136 309 B1 | 11/2006 | |
| EP | 1 544 492 B1 | 7/2007 | |
| GB | 2 266 934 A | 11/1993 | |
| JP | 57-159005 U | 6/1982 | |
| JP | 2-48666 U | 4/1990 | |
| NL | WO 9612108 A1 * | 4/1996 | ............ F15B 7/006 |
| WO | WO 2007/039084 A1 | 4/2007 | |

* cited by examiner

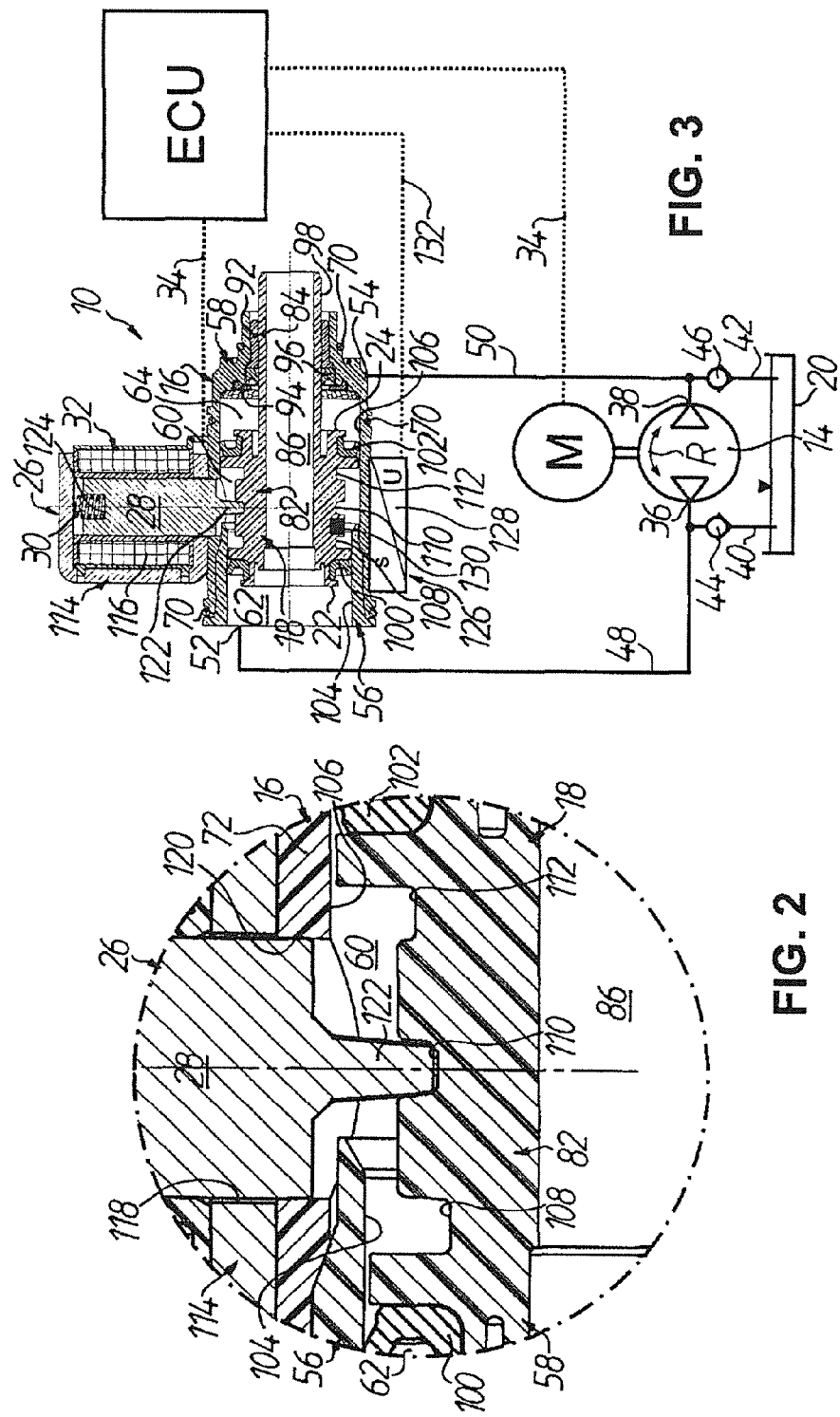

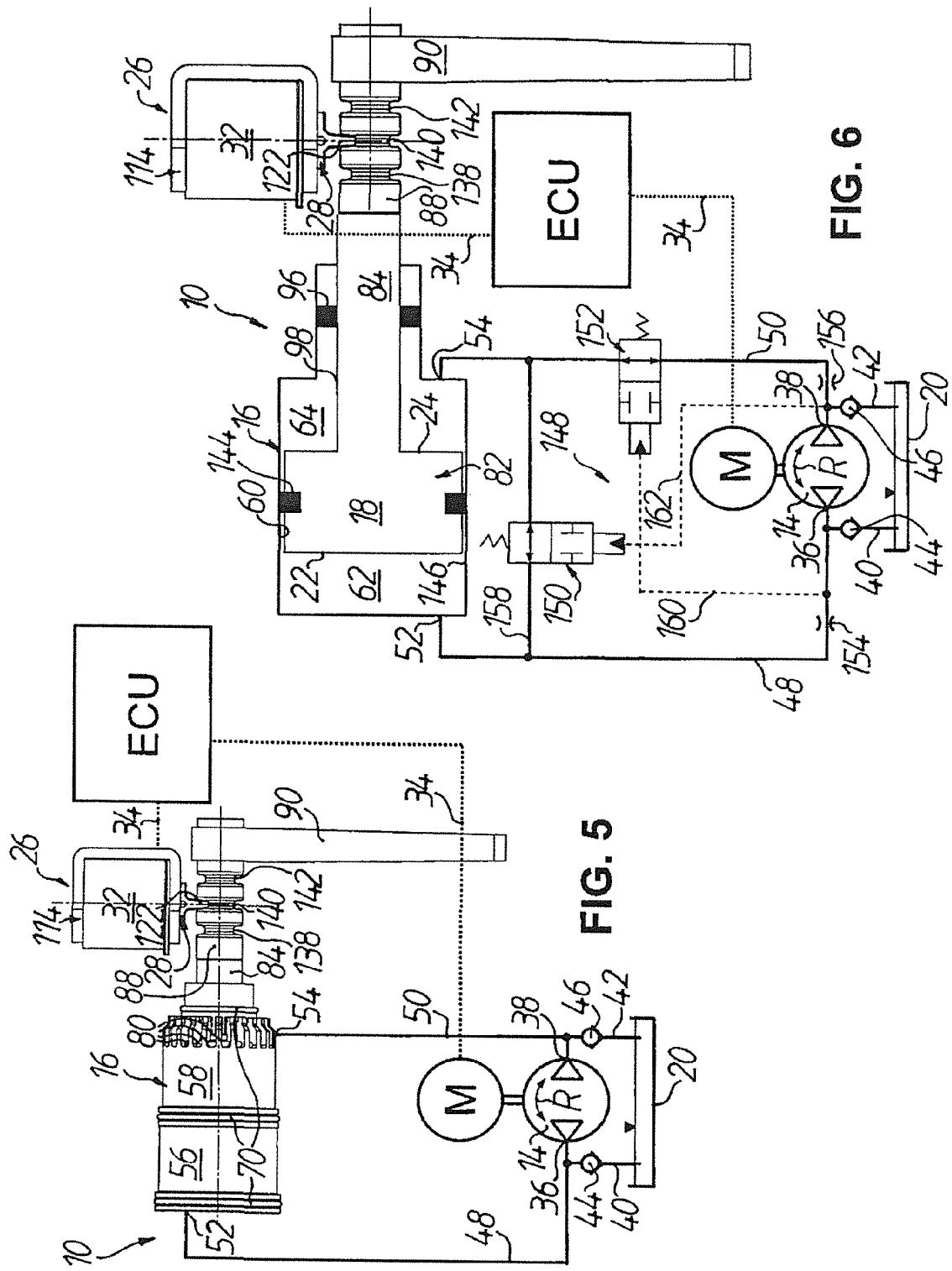

HYDRAULIC ACTUATING DEVICE FOR ACTUATION OF ONE OR MORE SETTING ELEMENTS IN, IN PARTICULAR, A MOTOR VEHICLE TRANSMISSION

TECHNICAL FIELD

The present invention relates to a hydraulic actuating in particular, to a hydraulic actuating device for actuation of one or more setting elements such as, for example, transmission selector elements in a motor vehicle transmission, which actuating devices are used in number in modern motor vehicles.

PRIOR ART

The mentioned transmission selector elements, which are employed in automatic shift gearboxes (ASG), twin-clutch or multi-clutch transmissions (TCT) as well as separable power-divider transmissions and transaxles, are usually selector forks and selector sleeves with or without synchronizers. The actuation of these components is carried out either electromechanically or hydraulically, wherein hydraulic actuation offers advantages with respect to physical arrangement in the transmission due to the high power density of the actuators. Thus, the selector forks or selector sleeves can be actuated directly and additional friction losses due to mechanical motion transmitting mechanisms or the like are avoided. The arrangement in the transmission also offers accommodation advantages relative to electromechanical actuation systems, which often protrude beyond the silhouette of the transmission and thus hamper installation of the transmission in the motor vehicle.

Known hydraulic actuating devices (see, for example, DE A-43 09 901, FIG. 1; DE-A-196 37 001, FIG. 27; DE-A-199 50 443, FIG. 11F) usually have a pressure generating or pumping and storage unit (so-termed 'powerpack'), a valve block with a plurality of electromagnetically actuable valves for distribution of the hydraulic energy to the individual actuators, lines for conducting fluid as well as the actuators or cylinders themselves, optionally with integrated sensor system for positional determination of the selector elements. Activation of the hydraulic actuating device in a motor vehicle transmission usually takes place by way of a transmission control unit or a superordinate vehicle computer.

A disadvantage of hydraulic actuating devices of that kind with storage is that the pressure medium, i.e. the hydraulic fluid, for charging of the storage has to be pumped to a pressure level far above the maximum required pressure in the actuators in order after withdrawal of the required quantity to still be able to offer the requisite working pressure, which is disadvantageous in terms of energy and significantly reduces the efficiency of the device. Moreover, the magnetic valves, which are predominantly constructed as slide valves, require a high degree of fluid cleanliness due to the closely toleranced gaps and frequently oblige filtering measures. Nevertheless, the slide valves used have a not inconsiderable amount of leakage, which over a corresponding period of service leads to complete discharging of the storage, which has the consequence of a delay, by the time for charging the storage, of the first actuation. In addition, in the case of driving without changing gear, for example on a motorway, recharging of the storage is therefore required at regular intervals, which is equally disadvantageous in terms of energy. Finally, the valve block with the magnetic valves takes up a considerable amount of installation space in the transmission and represents the greatest cost factor within the described actuating device.

Finally, a hydraulic actuating device for actuation of a transmission selector element (selector fork) in a motor vehicle transmission is known from EP A 0 786 052 (FIG. 1), using a pump, which has an electric pump drive and the pumping direction of which is reversible (so-termed reversing pump), a double-acting piston-cylinder arrangement, which is hydraulically connected with the pump and the piston of which is operatively connected with the transmission selector element, and a reservoir for hydraulic fluid, from which the hydraulic fluid can be conveyed by the pump to the piston-cylinder arrangement in order to hydraulically load the piston thereof on one or the other side thereof for movement of the transmission selector element depending on the respective pumping direction.

Although in this hydraulic actuating device a valve mechanism with exclusive hydraulic activation is provided for avoidance of electrically operated valves, which valve mechanism in a piston (end) position—which is moved to in the piston-cylinder arrangement—ensures pressure compensation at the piston in order to relieve the transmission selector element (selector fork) in terms of force, the cost even in the case of this prior art can be regarded as high, because an individual pump is needed for each piston-cylinder arrangement associated with a transmission switching element. Moreover, each pump has to be suitably controlled so that the piston-cylinder arrangement can also move to a (neutral) center position.

What is desired is to provide, for actuation of one or more setting elements in, in particular, a motor vehicle transmission, a hydraulic actuating device which avoids the above disadvantages and by comparison with the outlined prior art has above all a significantly improved overall efficiency with reduced costs.

SUMMARY OF THE INVENTION

According to one embodiment of the invention, a hydraulic actuating device for actuation of one or more setting elements in, in particular, a motor vehicle transmission includes a pump, which has an electric pump drive and the pumping direction of which is reversible. At least one double-acting piston-cylinder arrangement is hydraulically connected with the pump, the piston of which being operatively connected with the setting element. The device further includes a reservoir for hydraulic fluid, from which the hydraulic fluid can be conveyed by the pump to the piston-cylinder arrangement in order to hydraulically load the piston thereof on one or the other side thereof for movement of the setting element depending on the pumping direction. Each piston-cylinder arrangement is functionally associated with a detent device with a blocking element which is spring-biased into a blocking position to prevent movement of the setting element and which is movable by an electrically activatable actuator against the spring bias from the blocking position to a release position to permit movement of the setting element, wherein the pump drive and the actuator are electrically connected with a control unit which co-ordinates the electrical activation of pump drive and actuator.

The co-ordination of pump drive and actuator can in this regard be so carried out by the control unit that initially the actuator of the (respective) detent device is electrically activated in order to bring the blocking element from its blocking position, which prevents movement of the setting element without current, to a release position so that the detenting or blocking, which is produced by the detent device, of the setting element is cancelled. The control unit then electrically activates the pump drive in order to start the reversing pump with the desired pumping direction, whereupon the hydraulic pressure acting on the corresponding hydraulic effective surface of the piston of the piston-cylinder arrangement produces a movement of the setting element in predetermined direction. As soon as the setting element has now reached the desired position—which, for example, can be detected by way of a travel sensor at the piston cylinder arrangement—current supply to the actuator of the detent device is ended by the control unit and the pump drive switched off. The blocking element thereupon reverts, due to the spring bias, to its blocking position preventing movement of the setting element.

As an alternative thereto, pump drive and actuator or actuators of the detent device or devices can also be operated by the control unit with such co-ordination that initially the corresponding actuator is electrically activated in order to cancel the detenting of the setting element by drawing back the blocking element. The pump is then operated with a defined pumping direction in order to initiate a movement of the setting element in a predetermined direction and shortly thereafter the actuator is again switched to be without current so that the spring-biased blocking element automatically moves to its blocking position or effects a detenting as soon as this is again possible as a consequence of the relative position of the participating components (blocking element/setting element), whereupon the pump is switched off. No form of sensing of the piston position or the like is necessary in this alternative.

It is apparent that the proposed hydraulic actuating device operates very favorably in terms of energy with comparatively low outlay on technical hardware and thus low costs because application of current to the electrical components has to take place not until and only when movement of the (respective) setting element is required. Any form of store or slide valve—and thus a heightened level of increased fluid cleanliness—is in that regard just as little needed as a complicated pump control. Since, in addition, always two elements—pump drive and actuator of the (respective) detent device—have to be activated in order to initiate a movement, security against erroneous actuations is advantageously increased. The co-ordination of the electrical activation of pump drive and actuator of the (respective) detent device by way of the control unit ultimately makes it possible in similarly advantageous manner for further setting elements with a respective associated piston-cylinder arrangement to be able to be hydraulically activated by only one pump, in which case those setting elements which are not to be moved are kept free of current by the respective detent device, i.e. the blocking element thereof.

In principle, it is possible to provide the detent device at the respective setting element. In correspondence with the respective installation requirements the detent device can, however, also be mounted at the piston-cylinder arrangement, in which case the blocking element co-operates with blocking sections at the piston. This arrangement is to be preferred in most cases, because constructional outlay and constructional space at the setting element, for example a selector sleeve, is saved where the space is often very tightly dimensioned.

In this regard, the blocking sections at the piston can be formed by axially spaced-apart radial grooves at the piston circumference. This is advantageous not only with respect to production engineering, since such radial grooves can be formed at the piston in simple manner, but also because the piston does not have to be secured against rotation.

In a first alternative the piston of the piston-cylinder arrangement or at least one of the piston-cylinder arrangements can be provided on its hydraulically loadable sides with effective surfaces of the same size, which each bound a respective pressure chamber of the piston-cylinder arrangement. In this alternative, compensation is provided for the volume balance at the piston-cylinder arrangement, i.e. in the case of displacement of the piston, which is produced by conveying of a specific hydraulic fluid volume into one of the pressure chambers, the piston displaces the same hydraulic fluid volume into the other pressure chamber. It is therefore not necessary to take any precautions to make possible subsequent suction of hydraulic fluid from the reservoir in order to compensate for volume differences.

In a second alternative, the piston of the piston-cylinder arrangement or at least one of the piston-cylinder arrangements can have on its hydraulically loadable sides effective surfaces of different sizes, which each bound a respective pressure chamber of the piston-cylinder arrangement, wherein provided between the reversing pump and the (respective) piston-cylinder arrangement is a valve arrangement which is hydraulically activatable—which is very advantageous in terms of energy—by the pump pressure and which in the case of displacement of the piston ensures compensation for the volume difference between the pressure chambers. This embodiment is appropriate when the piston-cylinder arrangement is to be of particularly short construction. Thus, for pistons—from one side of which a piston rod which usually operatively connects the piston and setting element extends and by the cross-section of which rod the corresponding hydraulic effective surface of the piston is reduced—only a cylinder guide surface of constant diameter is needed, whereas in the case of the above-mentioned first alternative the cylinder guide surface usually has two sections of different diameter, thus has two stroke lengths, so as to provide compensation in terms of area for the cross-section of the piston rod in order to achieve effective surfaces of the same area at the piston.

If travel information is needed for the co-ordination of the electrical activation of pump drive and actuator and/or for other purposes then the piston-cylinder arrangement can include a sensor device for detecting the piston position, preferably with a sensor arranged at the cylinder housing and a signal element attached to the piston. Alternatively, such a sensor device can, however, also be provided at the setting element.

In addition, the electrically activatable actuator may be an electromagnetic actuator, wherein the inductance of the actuator is detectable by the control unit in order to determine the position of the blocking element. Thus, positional information with regard to the respective blocking element can be obtained in conceptually simple mode and manner. In this connection, the afore-mentioned radial grooves at the piston circumference can advantageously have a different groove depth so that through detection of the inductance of the electromagnetic actuator by way of the control unit the axial position of the piston in the cylinder housing is also determinable.

Finally, in accordance with another aspect of the invention if the plurality of setting elements—such as the selector forks or selector sleeves in a multi-gear automatic shift gearbox (AST) for motor vehicles—is to be actuated a plurality of double-acting piston-cylinder arrangements can be provided. The pistons may each be operatively connected with a respective setting element, wherein the piston-cylinder arrangements are advantageously hydraulically connected in parallel with respect to the only one pump.

BRIEF DESCRIPTION OF THE DRAWINGS

The invention is explained in more detail in the following by way of preferred embodiments with reference to the accompanying, partly schematic drawing, in which the same reference numerals denote the same or corresponding parts and elastomeric parts are for simplification of the illustration shown mostly in the undeformed state and in which:

FIG. 2 shows an illustration, to an enlarged scale, of the detail II in FIG. 1, which illustrates how a blocking element of the detent device co-operates with blocking sections at the piston of the piston-cylinder arrangement, which blocking sections are formed at the piston circumference by axially spaced-apart radial grooves with different groove depths;

FIG. 3 shows a circuit diagram of a variant of the hydraulic actuating device according to the first embodiment, in which the radial grooves of the piston circumference are of the same depth and a sensor device is additionally provided for sensing the piston position;

FIG. 5 shows a circuit diagram of a hydraulic actuating device with only one piston-cylinder arrangement for actuation of a setting element (selector rod with a selector fork) in a motor vehicle transmission, wherein the detent device by contrast to the previous embodiments is provided at the setting element, as a third embodiment according to the invention; and FIG. 6 shows a circuit diagram of a hydraulic actuating device with only one piston-cylinder arrangement for actuation of a motor vehicle transmission setting element (selector rod with selector fork) at which the detent device is provided, wherein the piston of the piston-cylinder arrangement by contrast to the previous embodiments has two effective surfaces of different size and connected between pump and piston-cylinder arrangement is a valve arrangement which in case of piston displacement serves for compensation of the volume difference between the pressure chambers of the piston-cylinder arrangement, as a fourth embodiment according to the invention.

Figure 1:
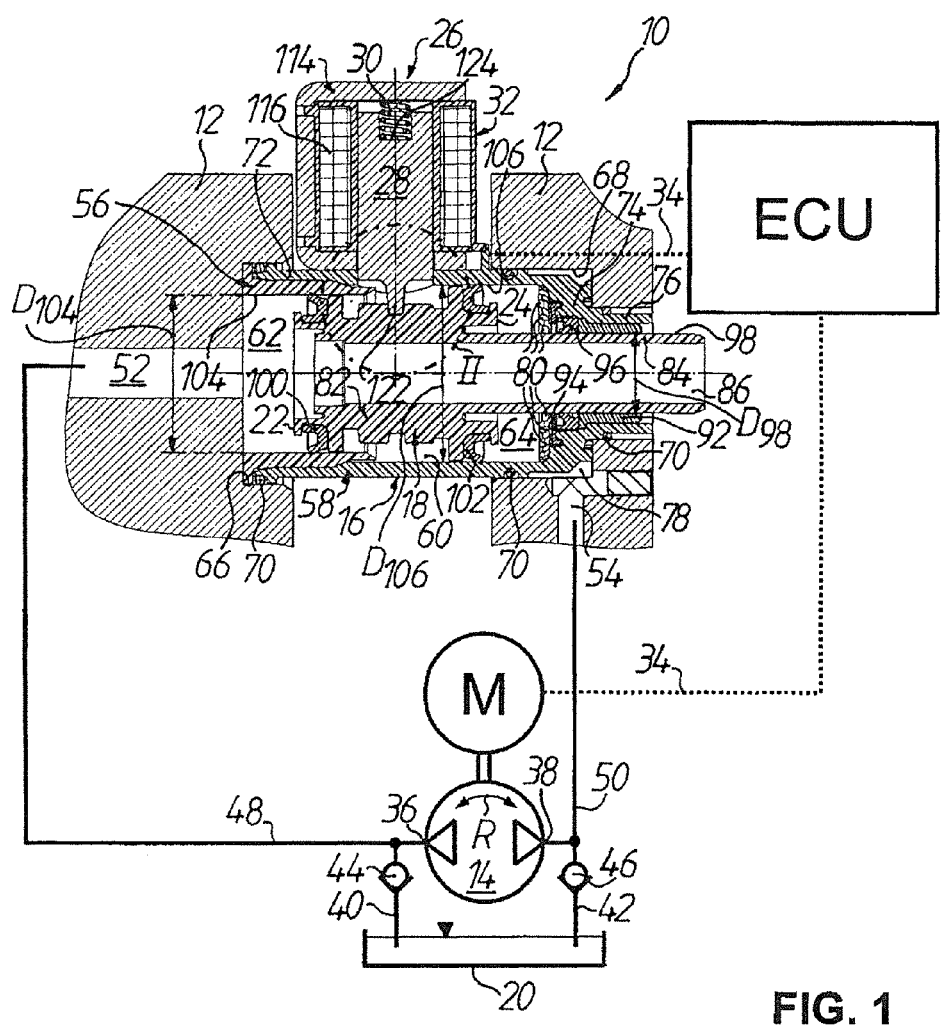
FIG. 1 shows a circuit diagram of a hydraulic actuating device for actuation of a setting element in a motor vehicle transmission, with only one piston-cylinder arrangement, which, provided with a detent device, is integrated in the transmission housing, as a first embodiment according to the invention.

In the drawings—and in the following description—a more detailed illustration or explanation of the setting elements to be actuated has been dispensed with, because these elements and the function thereof are well known to the expert and explanations with respect thereto do not appear necessary for the understanding of the present invention.

DETAILED DESCRIPTION OF THE EMBODIMENTS

In FIG. 1 reference numeral 10 generally denotes a hydraulic actuating device for actuation of a setting element (not shown here)—for example a selector rod with selector fork or a selector sleeve—in a motor vehicle transmission, of which in FIG. 1 merely the transmission housing 12, which in a given case is multi-part, is illustrated partly schematically. As will be described in more detail in the following, the hydraulic actuating device 10 includes a pump 14, which has an electric pump drive M of which the pumping direction (double arrow R in FIG. 1) can be reversed (so-termed reversible pump), a double-acting piston-cylinder arrangement 16, which is hydraulically connected with the pump 14 and the piston 18 of which is operatively connected with the setting element, and a reservoir 20 for hydraulic fluid, from which the hydraulic fluid can be conveyed by the pump 14 to the piston-cylinder arrangement 16 in order to hydraulically load the piston thereof on one effective surface 22 or the other effective surface 24 i.e. two sides of the piston 18 for movement of the setting element in dependence on the respective pumping direction R. It is significant that the piston-cylinder arrangement 16 is functionally and, in a given case, also physically associated with a detent device 26 with a blocking element 28, which is spring-biased—for example with the help of a helical compression spring 30, as shown—into a blocking position (illustrated in FIG. 1) preventing movement of the setting element and which is movable by an electrically activatable, preferably electromagnetic actuator 32 against the spring bias from the blocking position to a release position permitting or enabling movement of the setting element. In this regard, the pump drive M and the actuator 32 are electrically connected via, e.g. a supply cable 34 with a control unit ECU which appropriately co-ordinates the electrical activation of pump drive M and actuator 32, as already briefly described in the introduction.

The pump 14 has two hydraulic connections 36, 38 of which, depending on the pumping direction which is selected or which is predetermined by the control unit ECU, one connection forms the pump inlet (suction connection), by way of which the hydraulic fluid is sucked or fed, and the other connection forms the pump outlet (pressure connection), by way of which the hydraulic fluid under pressure is delivered. Coming into question as pump types here are, for example, gearwheel pumps, roller cell pumps, vane pumps and radial or axial piston pumps. For the present application it is sufficient if the pump 14 is realized as a constant pump, which supplies a constant volume flow for a predetermined rotational speed of the pump drive M. The pump drive M can optionally be controllable in rotational speed in order, for example, to be able to influence the setting speed at the setting element. The application of current or activation of the pump drive M takes place by way of the supply cable 34, which is illustrated as a dotted line in FIG. 1 and which is electrically connected with the control unit ECU.

Each hydraulic connection 36, 38 of the pump 14 is connected with the reservoir 20 by way of a suction line 40, 42, into which a non-return valve 44, 46 blocking in the direction of the reservoir 20 is connected. The non-return valves 44, 46 can be biased into their position blocking in the direction of the reservoir 20; however this is not shown in the Figures. In addition, a pressure line 48, 50 which ensures a hydraulic connection with the piston-cylinder arrangement 16 is connected with each hydraulic connection 36, 38. To that extent, it will be evident to the expert that if the pump 14 is, for example, operated with a pumping direction R in clockwise sense in FIG. 1 the pump 14 sucks hydraulic fluid from the pressure line 48 by way of the hydraulic connection 38 and in a given case from the reservoir 20 by way of the non-return valve 44 and the suction line 40. However, by way of its other hydraulic connection 38 the pump 14 conveys hydraulic fluid under pressure in the pressure line 50. In this regard, the non-return valve 46 prevents a pressure decay or a return flow of the hydraulic fluid to the reservoir 20. In an analogous manner, the pressure line 50 is relieved of pressure while the pressure line 48 is subjected to pressure if the pump 14 is operated with a pumping direction R in counter-clockwise sense in FIG. 1. Hydraulic fluid is conveyed or displaced in FIG. 1 from the right of the pump 14 to the left of the pump 14.

The pressure lines 48, 50 respectively lead to control or pressure connections 52, 54 of the piston-cylinder arrangement 16. The pressure connections 52, 54 are schematically illustrated in FIG. 1 simply as channels in the transmission housing 12, which in the illustrated embodiment forms together with two insert parts 56, 58 a cylinder chamber 60 of the piston-cylinder arrangement 16, in which the piston 18 separates two pressure chambers 62, 64 from one another.

The insert parts 56, 58, which are preferably produced from a plastics material such as polyphtalamide (PPA) with a predetermined glass fiber content, for example 50% by injection molding, are tightly inserted into associated stepped bores 66, 68 of the transmission housing 12 and telescopically fitted one into the other. Collars, projections, grooves or the like at the outer circumference of the insert parts 56, 58 in that case form receiving sections for O-rings 70, which co-operate with the wall surfaces of the stepped bores 66, 68 in the transmission housing 12 in order to statically seal the piston-cylinder arrangement 16 relative to the environment. The insert part 56 at the left in FIG. 1 has substantially the form of a sleeve and bears by its left hand end face against a projection of the stepped bore 66 in the transmission housing 12. The insert part 58 on the right in FIG. 1 is formed to be substantially beaker-shaped, with a jacket section 72 and a base section 74, which adjoins thereat on the right in FIG. 1. The insert part 58 is seated on a projection of the stepped bore 68 in the transmission housing 12, and has a substantially hollow-cylindrical extension 76, which adjoins the base section 74 similarly on the right in FIG. 1.

The pressure connection 52 on the left in FIG. 1 opens quasi directly into the pressure chamber 62 within the insert part 56. The pressure connection 58 on the right in FIG. 1, opens into an annular chamber 78, which, surrounding the base section 74 of the insert part 58, is bounded outwardly by the transmission housing 12 and inwardly by the insert part 58 as well as laterally by the intermediately disposed O-rings 70. This annular chamber 78 is disposed in fluid connection with the pressure chamber 64 by way of a plurality of passages 80 in the base section 74 of the insert part 58, which passages are uniformly distributed over the circumference of the insert part 58 (cf., with respect thereto, also the piston-cylinder arrangement 16 shown at the top in FIG. 4, but not in section).

The piston 18 of the piston-cylinder arrangement 16 is a shank piston, which is preferably similarly produced by injection-molding from a plastics material such as polyphtalamide (PPA) with a predetermined glass fiber content, for example 50%. A piston part 82 and a piston shank 84 are provided with a stepped bore 86 running continuously through. The stepped bore 86 serves, in a manner known per se, for hydraulically sealed as well as axial tension-resistant and pressure-resistant reception of a selector rod, which is not illustrated in FIGS. 1 to 4, but which is provided in FIGS. 5 and 6 with the reference numeral 88. In the mounted state, the selector rod ends in FIG. 1 to the left near or at the end of the piston part 82, where it hydraulically tightly closes or bounds the pressure chamber 62, whereas it projects in FIG. 1 to the right beyond the end of the piston shank 84 and carries at its protruding end, for example, the selector fork as is shown in FIGS. 5 and 6 at 90.

At the outer circumferential side the piston shank 84 is displaceably guided in a slide bush 92, which is in turn fastened in the extension 76 of the insert part 58. Arranged between the slide bush 92 and a retaining ring 94 mounted at the base sections 74 of the insert part 58 is a sealing element 96—in the illustrated embodiment a groove ring known per se—which co-operates with the outer circumferential surface 98 of the piston shank 84 in order to dynamically seal off the pressure chamber 64 to the right in FIG. 1.

The piston part 82 is larger in diameter by comparison with the piston shank 84, and is provided at the outer circumferential side at each of the two longitudinal ends with a respective radial groove as is known for grooved rings for receiving a respective sealing element 100 or 102, in the illustrated embodiment. In that case the sealing element 100 at the left in FIG. 1 co-operates with the inner circumferential surface 104 of the insert part 56 in order to dynamically seal off the pressure chamber 62, which is bounded at or in the piston 18 (also) by the selector rod (not shown here), to the right in FIG. 1. The sealing element 102, which is at the right in FIG. 1, at the piston part 82 co-operates with the inner circumferential surface 106 of the jacket section 72 of the insert part 58 in order to dynamically seal off the pressure chamber 64 to the left in FIG. 1.

A plurality of blocking sections is formed at the piston 18 in a pressure-free region of the cylinder chamber 60 between the sealing elements 100, 102. The blocking element 28 of the detent device 26, which in the illustrated embodiment is mounted at the piston-cylinder arrangement 16, co-operates with the blocking sections as will be explained in more detail below. At this point it is to be mentioned just that the blocking sections at the piston are encircling radial grooves 108, 110, 112 (see FIG. 2) which are axially spaced from one another and which are formed at the circumference of the piston part 82 of the piston 18.

In this embodiment the piston 18 is provided on its hydraulically loadable sides with effective surfaces 22, 24 of the same size, which bound the pressure chambers 62, 64 of the piston-cylinder arrangement 16. This is realized by way of different diameters $D_{104}$, $D_{106}$ of the inner circumferential surfaces 104, 106 of the insert parts 56, 58 in conjunction with the diameter $D_{98}$ of the outer circumferential surface 98 at the piston shank 84 of the piston 18. More precisely depending on the diameter $D_{98}$ of the outer circumferential surface 98, which co-operates with the sealing element 96, of the piston shank 84 the diameter $D_{106}$ of the inner circumferential surface 106, which co-operates with the sealing element 102, in the insert part 58 is selected to be larger than the diameter $D_{104}$ of the inner circumferential surface 104, which co-operates with the sealing element 100, in the insert part 56 by such an amount that the circular cross-sectional area, which is bounded by the inner circumferential surface 104, of the pressure chamber 62 (=effective surface 22 of the piston 18 at the left in FIG. 1) corresponds with the annular cross-sectional area, which is bounded by the outer circumferential surface 98 and the inner circumferential surface 106, of the pressure chamber 64 (=effective surface 24 of the piston 18 on the right in FIG. 1). This has the consequence that compensation is always provided for the volumetric balance at the piston-cylinder arrangement 16, i.e. if for—for example—a displacement of the piston 18 to the right in FIG. 1 a defined hydraulic fluid volume is conveyed into the pressure chamber 62 by way of the pressure connection 52 then the piston 18 displaces the same hydraulic fluid volume by way of the passages 18, the annular chamber 78 and the pressure connection 54 out of the pressure chamber 64 and conversely.

The detent device 26 comprises a housing 114, which in the illustrated embodiment is attached in suitable manner to the outer circumference of the insert part 58 of the piston-cylinder arrangement 16. A magnet coil 116 of the actuator 32 is received in the housing 114 and at least partly concentrically surrounds the ferromagnetic blocking element 28 which here functions as an armature of a magnetic drive. The blocking element 28 displaceable in piston-like manner in the magnet coil 116 engages through openings 118, 120 (see FIG. 2), which are formed in the housing 114 or in the insert part 58—more precisely the jacket section 72 thereof—and which are aligned with one another, so that a detent projection 122, which is provided at the end of the blocking element 28 lower in FIG. 1 and which slightly tapers in cross-section towards its free end, can enter into engagement with the radial grooves 108, 110, 112 in the piston part 82. At its other end, upper in FIG. 1, the blocking element 28 is provided with a cut-out 124 which serves as a bearing for the helical compression spring 30, which protrudes from the blocking element 28 and is supported at the housing 114. Finally, the application of current to the magnet coil 116 takes place by way of the supply cable 34, which is illustrated as a dotted line in FIG. 1 and which is electrically connected with the control unit ECU.

To that extent it is apparent that the helical compression spring 30 endeavors to urge the blocking element 28 out of the housing 114 of the detent device 26 so that in the current-free state of the magnet coil 116 the detent device 122 is kept, by virtue of the spring force, in engagement with one of the radial grooves 108, 110, 112 at the piston part 82. Through the thus-produced mechanically positive couple the piston 18 is prevented, even in the case of pressure loading of one of the pressure chambers 62, 64, from displacing in the piston-cylinder arrangement 16. If the magnet coil 116 conducts current then the resulting magnetic force draws the blocking element 28 against the force of the helical compression spring 30 back into the housing 114 in a direction extending substantially perpendicularly to the displacement direction of the piston 18, in which case the detent projection 122 comes free from the respective radial groove 108, 110 or 112. The piston 18 (and thus the setting element operatively connected with the piston 18) can now be displaced by pressure loading of the corresponding pressure chamber 62 or 64. The respective position of the detent device 26 (released or detented), i.e. of the blocking element 28, with respect to the housing 114 of the detent device 26 can be detected by the control unit ECU indirectly via the inductance of the actuator 32, which in the case of movement of the blocking element 28 relative to the housing 114 changes depending on the instantaneous air gap, thus the clear spacing, between blocking element 28 and housing 114 in the region of the helical compression spring 30.

In the illustrated embodiment, three radial grooves 108, 110, 112 are provided at the piston part 82, the axial position of which on the piston 18 and mutual spacing define specific positions of the setting element operatively connected with the piston 18. If the detent projection 122 as shown in FIGS. 1 and 2 is disposed in engagement with the middle radial groove 110 then this defines, for example, a neutral position of the setting element, in the case of an automatic shift gearbox (ASG), for example, a selector sleeve position between first and third gear, in which case no gear is engaged. If the detent projection 122 detents with the radial groove 108 or 112, then this defines a respective end position of the setting element, in the ASG case, for example, a selector sleeve position in which the first or third gear is engaged.

The embodiment according to FIGS. 1 and 2 here additionally has the radial grooves 108, 110, 112 at the circumference of the piston 18 with different groove depths, as can be readily seen particularly in FIG. 2. If the detent projection 122 is disposed in engagement with one of the radial grooves 108, 110, 112, then the blocking element 28 protrudes to a greater or lesser extent from the housing 114 of the detent device 26 depending on the depth of the respective radial groove, which gives rise to different air gaps at the actuator 32. Thus, through detection of the inductance of the actuator 32 by way of the control unit ECU it is possible to also indirectly determine the axial position of the piston 18 in the cylinder housing formed by (inter alia) the insert parts 56, 58. As a result, positional information, which is optionally additional, with respect to the respective position of the setting element can be obtained.

The following operation, for example, is possible with the afore-described hydraulic actuating device 10, wherein the control unit ECU suitably activates and co-ordinates the electric pump drive M and the electromagnetic actuator 32 of the detent device 26.

If the setting element is to be shifted from a predetermined position, which in this embodiment is, as described above, known (indirectly) by way of the inductance of the actuator 32, for example the center position according to FIGS. 1 and 2, then initially current is applied to the actuator 32 of the detent device 26 by way of the control unit ECU. As a consequence thereof the blocking element 28 is magnetically retracted against the force of the helical compression spring 30, in which case the detent projection 122 is freed from the respective—here the center—radial groove 110 at the piston 18 so that the detenting is released. Current is now applied by way of the control unit ECU to the pump drive M in such a manner that the pump 14 starts up with that pumping direction R which is needed for the desired setting movement direction, for example with a pumping direction R from the right of the pump 14 to the left of the pump 14 in FIG. 1. Consequently, a hydraulic loading of the pressure chamber 62 occurs and thus a displacement of the piston 18 to the right in FIG. 1. After a short movement travel of the piston 18, the application of current to the actuator 32 can be switched off so that the helical compression spring 30 endeavors to displace the blocking element 28 downwardly in FIG. 1. This takes place as soon as the piston 18 has, with respect to the blocking element 28, reached a position in which the detent projection 122 can slide into the radial groove 108. The pump drive M is now switched off so that the system is again entirely free of current.

It is apparent that the piston 18 can in this mode and manner be moved from one detent position to the next detent position. If the setting element is to be moved directly from one end position to the other end position, i.e. without movement to the center or neutral position, then current can be applied to the actuator 32 over a longer period of time, which has the effect that the middle radial groove 110 at the piston 18 'travels over' the retracted detent projection 122 without detenting therewith before the detent projection 122 comes into engagement with the radial groove 108 or 112 in the respective end position.

A variant of the afore-described embodiment shall now be explained in the following, with reference to FIG. 3, only to such an extent as it differs therefrom. For simplification of illustration, a fresh description of parts of the transmission housing 112 was dispensed with in FIG. 3.

In the variant according to FIG. 3 the radial grooves 108, 110, 112 at the circumference of the piston 18 do not have different groove depths, but rather are formed to be of the same depth. For that purpose, the piston-cylinder arrangement 16 comprises a sensor device 126 for detecting the respective position of the piston 18 in the piston-cylinder arrangement 16, with a sensor 128, for example a Hall sensor known per se, arranged at the cylinder housing—more precisely at the outer circumference of the insert part 58 of the piston-cylinder arrangement 16—and suitably mounted there, and a signal element 130, for example a block-shaped permanent magnet, suitably fastened to the piston 18, in the illustrated embodiment between the radial grooves 108 and 110 at the piston part 82. The sensor 128 is connected with the control unit ECU by way of a signal cable 132.

In this embodiment as well the detent projection 122 at the blocking element 28 of the detent device 26 is, in the current-free state of this system, disposed in engagement with the radial grooves 108, 110, 112 at the piston 18 as a consequence of the force of the helical compression spring 30 so as to prevent displacement of the piston 18. If current is applied to the actuator 32 of the detent device 26 by way of the control unit ECU then the magnet coil 116 draws back the blocking element 28, i.e. in upward direction in FIG. 3, which releases the detenting, i.e. the detent projection 122 comes free from the respective radial groove 108, 110 or 112. The control unit ECU now controls the pump drive M, whereupon the pressure-loaded piston 18 moves in the desired setting direction depending on the predetermined pumping direction R. In that case, the respective position of the piston 18 is determined by way of the sensor device 126, which detects the respective relative position of the signal element 130 with respect to the sensor 128, which is stationary with respect to the piston-cylinder arrangement 16. Shortly before the desired detent position of the piston 18 the control unit ECU terminates the application of current to the magnet coil 116, whereupon the blocking element 28 endeavors to move forwardly, i.e. downwardly in FIG. 3, due to the force of the helical compression spring 30. As soon as the corresponding radial groove 108, 110 or 112 at the piston part 82 is now, with further movement of the piston, aligned with the detent projection 122 of the blocking element 28 this slides into the radial groove in order to fix the piston 18 in axial direction. Finally, the control unit ECU subsequently switches off the pump drive M.

Figure 4:
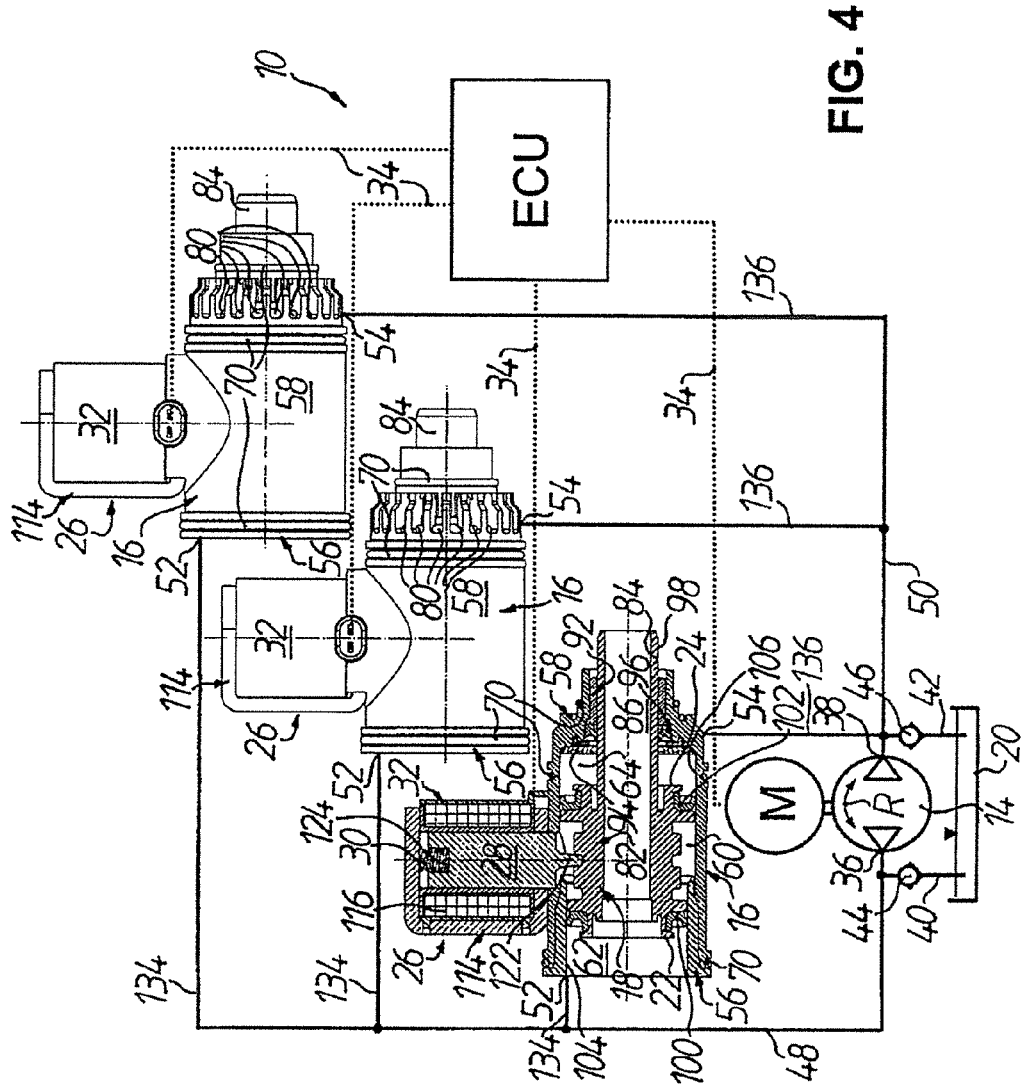
FIG. 4 shows a circuit diagram of a hydraulic actuating device for the actuation of a plurality of setting elements in a motor vehicle transmission, with a corresponding number of piston-cylinder arrangements, which are connected hydraulically in parallel with respect to the single pump, as a second embodiment according to the invention.

A further embodiment for a hydraulic actuating device 10 can be inferred from FIG. 4, in which by contrast to the afore-described embodiments a plurality of double-acting piston-cylinder arrangements 16 (here three) is provided, the pistons 18 of which are each disposed in operative connection with a respective setting element (not shown). For simplification of the illustration a description of parts of the transmission housing in which the piston-cylinder arrangements 16 are mounted was again dispensed with in FIG. 4, just as an illustration of sensor devices for detecting the respective piston position or setting element position.

According to FIG. 4, branching off the pressure lines 48, 50, which lead to the (first) piston-cylinder arrangement 16 which is upper in FIG. 4, are connecting lines 134, 136 which are hydraulically connected with the pressure connections 52, 54 of the further piston-cylinder arrangement 16 in order to hydraulically switch all the piston-cylinder arrangements 16 in parallel with respect to the single pump 14.

It will be apparent that a specific setting element can be moved in that the control unit ECU through application of current to the detent device 26 cancels the piston detention at the piston-cylinder arrangement 16 associated with this setting element and switches on the pump 14 with a specific pumping direction R in dependence on the desired setting direction, while the pistons 18 of the further piston-cylinder arrangements 16 are kept free of current by way of the detent devices 26 functionally associated therewith. It is also possible with this switching to move several setting elements at the same time in the same setting direction in that current is applied to the corresponding detent devices 26 and the pump drive M at the same time, whereupon the pressure-loaded, freed pistons 18 move in the same setting direction.

FIG. 5, which similarly has the simplifications discussed with respect to FIG. 4, shows a further embodiment of a hydraulic actuating device 10, which differs from the afore-described embodiment essentially in that the detent device 26 is arranged not at the piston-cylinder arrangement 16, but at the actual setting element, here a selector rod 88 carrying a selector fork 90, which reduces the installation space requirement for or at the piston-cylinder arrangement 16. In this regard, the selector rod 88 is provided at the outer circumference thereof with radial grooves 138, 140, 142 which co-operate in the described mode and manner with the detent projection 122 at the blocking element 28 of the detent device 26 in order to hold the setting element—and thus also the piston 18 of the piston-cylinder arrangement 16—selectably by detenting with current-free magnet coil 116 or to release it by cancelling the detenting with application of current to the detent device 26.

Finally, FIG. 6 shows, in an illustration which is schematic to a greater degree by comparison with the preceding figures, yet a further embodiment of a hydraulic actuating device 10, which differs from the afore-described embodiments essentially in that the piston 18 has on its hydraulically loadable sides effective surfaces 22, 24 of different size, which each bound a respective pressure chamber 62 or 64 of the piston-cylinder arrangement 16. In that case, only one sealing element 144 at the outer circumference of the piston 18 co-operates with only one cylinder guide surface 146 of the piston-cylinder arrangement 16 in order to hydraulically separate the pressure chambers 62, 64 from one another, which significantly shortens piston-cylinder arrangement 16 by comparison with the afore-described embodiments. In order to ensure, in the case of a displacement of the piston 18, compensation for the volumetric difference between the pressure chambers 62, 64, which results from the different sizes of the hydraulically effective surfaces 22, 24 for the same piston stroke, a valve arrangement 148 hydraulically activatable by the pump pressure is provided between the pump 14 and the piston-cylinder arrangement 16.

In the illustrated embodiment this valve arrangement 148 comprises two pressure-controlled 2-2-way valves 150, 152, which are spring-biased into the throughflow zero position, as well as two apertures 154, 156. Whereas the first 2-2-way valve 150 is connected into a connecting line 158 between the pressure lines 48, 50, a second 2-2-way valve 152 is seated in the pressure line 50 in front—coming from the pump 14—of the connecting line 158. The aperture 154 is arranged in the pressure line 48 in front—coming from the pump 14—of the connecting line 158, while the aperture 156 is connected into the pressure line 50 between the hydraulic connection 38 of the pump 14 and the second 2-2-way valve 152. A control line 160 is connected with the pressure line 48 between the hydraulic connection 36 of the pump 14 and the aperture 154 and leads to the second 2-2-way valve 152 in the pressure line 50 so that this is hydraulically activatable by the pressure derived from the pressure line 48. Equally, a control line 162 is connected with the pressure line 50 between the hydraulic connection 38 of the pump 14 and the aperture 156 and leads to the first 2-2-way valve 150 in the connecting line 158 so that this is hydraulically activatable by the pressure derived from the pressure line 50.

Instead of the 2-2-way valve 152 activated by way of the control line 160 it is possible, however, to also arrange in the same position in the pressure line 50 a non-return valve (not shown) blocking in the direction of the pump 14 and optionally combined with the aperture 156. The aperture 154 in the pressure line 48 is then also redundant.

The functioning of this circuit is as follows: If the pump 14 rotates with a pumping direction R in counter-clockwise sense in FIG. 6, then as a consequence of the aperture 154 a back-pressure arises in the pressure duct 48 and is passed on by way of the control line 160 to the 2-2-way valve 152 and closes this. However, the 2-2-way valve 150 remains open so that as a consequence of the hydraulic connection via the connecting line 158 the two effective surfaces 22, 24 of the piston 18 are equally loaded with pressure. By virtue of the larger effective surface 22 on the side of the piston 18 at the left in FIG. 1 the piston 18 displaces to the right in FIG. 1, obviously assuming that the detenting of the selector rod 88 is cancelled by application of current to the detent device 26. The hydraulic fluid volume displaced from the annular pressure chamber 64 (right hand) is in that case utilized for filling the cylindrical pressure chamber 62 (left hand); the hydraulic fluid volume still missing is fed from the reservoir 20 by the pump 14 via the non-return valve 46.

If the pump drive M is so controlled by the control unit ECU that the pump 14 conveys hydraulic fluid with a pumping direction R in clockwise sense in FIG. 6, then as a consequence of the aperture 156 a back-pressure arises in the pressure line 50. This back-pressure is reported by way of the control line 162 to the 2-2-way valve 150 in the connecting line 158 and closes this. However, the 2-2-way valve 152 in the pressure line 150 remains open. The annular pressure chamber 64 of the piston-cylinder arrangement 16 is thus connected with the current pressure region (hydraulic connection 38) of the pump 14 and separated from the current suction region (hydraulic connection 36) of the pump 14. The cylindrical pressure chamber 62 of the piston-cylinder arrangement 16 is connected with the current suction region (hydraulic connection 36) of the pump 14. Due to the pressure difference acting at the piston 18 the piston 18 is as a result displaced to the left in FIG. 6, obviously assuming that the selector rod 88 is freed by the detent device 26 under current.

A hydraulic actuating device for actuating at least one setting element in, in particular, a motor vehicle transmission is disclosed, comprising a pump, which has an electric pump drive, with reversible pumping direction, at least one double-acting piston-cylinder arrangement, which is connected therewith and the piston of which is operatively connected with the setting element, and a hydraulic fluid reservoir, from which hydraulic fluid can be pumped to the piston-cylinder arrangement in order to hydraulically load the piston thereof on one or the other side for a setting element movement depending on the respective pumping direction. In this regard, the piston-cylinder arrangement is functionally associated with a detent device with a blocking element, which is spring-biased into a blocking position preventing setting element movement and is movable by an electrically activatable actuator from the blocking position to a release position permitting blocking element movement. Pump drive and actuator are, in addition, electrically connected with a control unit which co-ordinates the electrical activation of these components. As a result, a setting element actuation with a high level of overall efficiency is possible with low costs.

Variations and modifications are possible without departing from the scope and spirit of the present invention as defined by the appended claims.

We claim:

1. An actuating device for hydraulic actuation of one or more setting elements in a motor vehicle transmission, comprising a pump, which has an electric pump drive and the pumping direction of which is reversible, at least one double-acting piston-cylinder arrangement, which is hydraulically connected with the pump and the piston of which is operatively connected with the setting element, and a reservoir for hydraulic fluid, from which the hydraulic fluid can be conveyed by the pump to the piston-cylinder arrangement in order to hydraulically load the piston thereof on one effective surface side or other effective surface side of the piston for movement of the setting element depending on the respective pumping direction, characterized in that the or each piston-cylinder arrangement is functionally associated with a detent device with a blocking element, which is spring-biased into a blocking position preventing movement of the setting element and which is movable by an electrically activatable actuator against the spring bias from the blocking position to a release position permitting movement of the setting element, wherein the pump drive and the actuator are electrically connected with a control unit which co-ordinates the electrical activation of pump drive and actuator, wherein said control unit activates said actuator before said control unit activates said electric pump drive to hydraulically load the piston of the piston-cylinder arrangement for permitting and providing movement of the setting element, and the detent device is mounted at the piston-cylinder arrangement, wherein the blocking element co-operates with blocking sections at the piston.

2. An actuating device according to claim 1, further characterized in that the blocking sections at the piston are formed by axially spaced-apart radial grooves at the piston circumference.

3. An actuating device according to claim 2, further characterized in that the piston is provided on its hydraulically loadable sides with effective surfaces which are of the same size and which each bound a respective pressure chamber of the piston-cylinder arrangement.

4. An actuating device according to claim 2, further characterized in that the piston has on its hydraulically loadable sides effective surfaces which are of different size and which each bound a respective pressure chamber of the piston-cylinder arrangement, wherein provided between the pump and the piston-cylinder arrangement is a valve arrangement which is hydraulically activatable by the pump pressure and which on displacement of the piston ensures compensation for the volumetric difference between the pressure chambers.

5. An actuating device according to claim 2, further characterized in that the piston-cylinder arrangement comprises a sensor device for detecting the piston position, the sensor device comprising a sensor arranged at the cylinder housing and a signal element attached to the piston.

6. An actuating device according to claim 2, further characterized in that the electrically activatable actuator is an electromagnetic actuator, wherein the inductance of the actuator is detectable by the control unit in order to determine the position of the blocking element.

7. An actuating device according to claim 1, further characterized in that the piston is provided on its hydraulically loadable sides with effective surfaces which are of the same size and which each bound a respective pressure chamber of the piston-cylinder arrangement.

8. An actuating device according to claim 1, further characterized in that the piston has on its hydraulically loadable sides effective surfaces which are of different size and which each bound a respective pressure chamber of the piston-cylinder arrangement, wherein provided between the pump and the piston-cylinder arrangement is a valve arrangement which is hydraulically activatable by the pump pressure and which on displacement of the piston ensures compensation for the volumetric difference between the pressure chambers.

9. An actuating device according to claim 1, further characterized in that the piston is provided on its hydraulically loadable sides with effective surfaces which are of the same size and which each bound a respective pressure chamber of the piston-cylinder arrangement.

10. An actuating device according to claim 9, further characterized in that the piston-cylinder arrangement comprises a sensor device for detecting the piston position, the sensor device comprising a sensor arranged at the cylinder housing and a signal element attached to the piston.

11. An actuating device according to claim 1, further characterized in that the piston has on its hydraulically loadable sides effective surfaces which are of different size and which each bound a respective pressure chamber of the piston-cylinder arrangement, wherein provided between the pump and the piston-cylinder arrangement is a valve arrangement which is hydraulically activatable by the pump pressure and which on displacement of the piston ensures compensation for the volumetric difference between the pressure chambers.

12. An actuating device according to claim 11, further characterized in that the piston-cylinder arrangement comprises a sensor device for detecting the piston position, the sensor device comprising a sensor arranged at the cylinder housing and a signal element attached to the piston.

13. An actuating device according to claim 1, further characterized in that the piston-cylinder arrangement comprises a sensor device for detecting the piston position, the sensor device comprising a sensor arranged at the cylinder housing and a signal element attached to the piston.

14. An actuating device according to claim 13, further characterized in that the electrically activatable actuator is an electromagnetic actuator, wherein the inductance of the actuator is detectable by the control unit in order to determine the position of the blocking element.

15. An actuating device according to claim 1, further characterized in that the electrically activatable actuator is an electromagnetic actuator, wherein the inductance of the actuator is detectable by the control unit in order to determine the position of the blocking element.

16. An actuating device according to claim 1, further characterized in that a plurality of double-acting piston-cylinder arrangements is provided, the pistons of which are each operatively connected with a respective setting element, wherein the piston-cylinder arrangements are hydraulically connected in parallel with respect to the single pump.

17. An actuating device for hydraulic actuation of one or more setting elements in a motor vehicle transmission, comprising a pump, which has an electric pump drive and the pumping direction of which is reversible, at least one double-acting piston-cylinder arrangement, which is hydraulically connected with the pump and the piston of which is operatively connected with the setting element, and a reservoir for hydraulic fluid, from which the hydraulic fluid can be conveyed by the pump to the piston-cylinder arrangement in order to hydraulically load the piston thereof on one effective surface side or other effective surface side of the piston for movement of the setting element depending of the respective pumping direction, characterized in that the or each piston-cylinder arrangement is functionally associated with a detent device with a blocking element, which is spring-biased into a blocking position preventing movement of the setting element and which is movable by an electrically activatable actuator against the spring bias from the blocking position to a release position permitting movement of the setting element, wherein the pump drive and the actuator are electrically connected with a control unit which co-ordinates the electrical activation of pump drive and actuator, and the detent device is mounted at the piston-cylinder arrangement, wherein the blocking element co-operates with blocking sections at the piston; the blocking sections at the piston are formed by axially spaced-apart radial grooves at the piston circumference; the electrically activatable actuator is an electromagnetic actuator, wherein the inductance of the actuator is detectable by the control unit in order to determine the position of the blocking element; and the radial grooves at the piston circumference have a different groove depth so that through detection of the inductance of the electromagnetic actuator the axial position of the piston in the cylinder housing is also determinable by way of the control unit.

\* \* \* \* \*